(12) United States Patent
Yu et al.

(10) Patent No.: US 11,960,184 B2
(45) Date of Patent: Apr. 16, 2024

(54) DISPLAY PANEL AND ELECTRONIC TERMINAL

(71) Applicant: WUHAN CHINA STAR OPTOELECTRONICS TECHNOLOGY CO., LTD., Wuhan (CN)

(72) Inventors: Wenqiang Yu, Wuhan (CN); Guanghui Liu, Wuhan (CN); Chao Wang, Wuhan (CN)

( * ) Notice: Subject to any disclaimer, the term of this patent is extended or adjusted under 35 U.S.C. 154(b) by 399 days.

(21) Appl. No.: 16/972,645

(22) PCT Filed: Nov. 30, 2020

(86) PCT No.: PCT/CN2020/132577
§ 371 (c)(1),
(2) Date: Dec. 7, 2020

(87) PCT Pub. No.: WO2022/088368
PCT Pub. Date: May 5, 2022

(65) Prior Publication Data
US 2022/0404653 A1  Dec. 22, 2022

(30) Foreign Application Priority Data
Oct. 27, 2020  (CN) .......................... 202011164589.0

(51) Int. Cl.
*G02F 1/1362*  (2006.01)
*G02F 1/1335*  (2006.01)
(Continued)

(52) U.S. Cl.
CPC .. *G02F 1/136286* (2013.01); *G02F 1/133514* (2013.01); *G02F 1/134309* (2013.01);
(Continued)

(58) Field of Classification Search
CPC ......... G02F 1/133514; G02F 1/134309; G02F 1/1362; G02F 1/136286; G02F 1/1365; G02F 1/1368
See application file for complete search history.

(56) References Cited

U.S. PATENT DOCUMENTS

2004/0066363 A1  4/2004  Yamano
2019/0384121 A1  12/2019  Nishiwaki et al.
(Continued)

FOREIGN PATENT DOCUMENTS

CN  104898337 A  9/2015
CN  106462019 A  2/2017
(Continued)

*Primary Examiner* — Dung T Nguyen

(57) ABSTRACT

The present invention discloses a display panel and an electronic terminal. The display panel includes a first display region and a second display region. The second display region includes a plurality of display subregions. Each of the plurality of display subregions includes a display portion and a light-transmitting portion. Each of the plurality of display subregions includes a switch control unit, a liquid crystal layer, a transparent electrode group, and a color filter layer. The liquid crystal layer is disposed in the display portion and the light-transmitting portion. The transparent electrode group is configured to control a deflection direction of liquid crystal molecules in the liquid crystal layer, which puts the light-transmitting portion in a light-transmitting state or an opaque state.

19 Claims, 5 Drawing Sheets

(51) Int. Cl.
*G02F 1/1343* (2006.01)
*G02F 1/137* (2006.01)
(52) U.S. Cl.
CPC .... *G02F 1/133512* (2013.01); *G02F 1/13439* (2013.01); *G02F 1/137* (2013.01)

(56) References Cited

U.S. PATENT DOCUMENTS

2020/0236259 A1    7/2020  Nakamura et al.
2021/0407440 A1*  12/2021  Liu ................... G02F 1/133603

FOREIGN PATENT DOCUMENTS

| CN | 108761885 A |   | 11/2018 |
|----|-------------|---|---------|
| CN | 109870840 A |   | 6/2019  |
| CN | 110286521 A |   | 9/2019  |
| CN | 110426885 A |   | 11/2019 |
| CN | 110471211 A | * | 11/2019 |
| CN | 110471211 A |   | 11/2019 |
| CN | 110596928 A |   | 12/2019 |
| CN | 110709916 A |   | 1/2020  |
| CN | 110767141 A |   | 2/2020  |
| CN | 110908159 A |   | 3/2020  |
| CN | 110967857 A |   | 4/2020  |
| CN | 110989232 A |   | 4/2020  |
| CN | 111208682 A |   | 5/2020  |
| CN | 111367110 A |   | 7/2020  |
| CN | 111538181 A |   | 8/2020  |
| CN | 111624794 A |   | 9/2020  |

* cited by examiner

DISPLAY PANEL AND ELECTRONIC TERMINAL

FIELD OF INVENTION

The present invention is related to the field of display technology, and specifically, to a display panel and an electronic terminal.

BACKGROUND OF INVENTION

With rapid development of display panels, users have higher and higher requirements for screen-to-body ratios of display panels, which makes a full-screen display of display panels attract more and more attention from industry.

Display panels such as mobile phones and tablet computers need to integrate front-facing cameras, earpieces, infrared sensing components, etc. As shown in FIG. 1, in the prior art, a display panel 100 can be defined with a notch or an opening, and external light can enter a charge-coupled device positioned under a screen through a notch region or an opening region N on the screen. However, the opening region N cannot display images, so a display region of the display panel is incomplete, which means that the opening region cannot take a display function and a light transmission function both into account and cannot achieve a true full-screen display.

Therefore, it is necessary to propose a new technical solution to solve the above technical problems.

SUMMARY OF INVENTION

The present invention provides a display panel and an electronic terminal to improve a problem that an opening region cannot take a display function and a light transmission function both into account.

An embodiment of the present invention provides a display panel including a first display region and a second display region. The first display region surrounds at least a portion of the second display region. The second display region includes a plurality of display subregions. Each of the plurality of display subregions includes a display portion and a light-transmitting portion. Each of the plurality of display subregions includes:

a switch control unit;
a liquid crystal layer disposed in the display portion and the light-transmitting portion;
a transparent electrode group electrically connected to the switch control unit and corresponding to the display portion and the light-transmitting portion, wherein the transparent electrode group is configured to control a deflection direction of liquid crystal molecules in the liquid crystal layer, which puts the light-transmitting portion in a light-transmitting state or an opaque state; and
a color filter layer disposed in the display portion.

In the display panel provided by an embodiment of the present invention, each of the plurality of display subregions further includes scan lines and data lines.

The scan lines extend along a first direction. Each of the scan lines includes a first segment and a second segment, which are connected to each other. The first segment of each of the scan lines is disposed in the display portion. The second segment of each of the scan lines is disposed in the light-transmitting portion and is a transparent scan line.

The data lines extend along a second direction. Each of the data lines includes a first segment and a second segment. The first segment of each of the data lines is disposed in the display portion. The second segment of each of the data lines is disposed in the light-transmitting portion and is a transparent data line.

An intersection of the first segment of each of the scan lines and the first segment of each of the data lines, which are adjacent to each other, is defined as a pixel unit.

In the display panel provided by an embodiment of the present invention, the data lines include first type data lines and second type data lines. The first type data lines and the second type data lines are arranged along the first direction. A first segment of each of the second type data lines includes a transparent data line.

In the display panel provided by an embodiment of the present invention, the second type data lines are disposed on a side of the display portion adjacent to the light-transmitting portion.

In the display panel provided by an embodiment of the present invention, the color filter layer includes light-shielding strips and color resist blocks. Each of the light-shielding strips corresponds to a first segment of each of the first type data lines. One of the color resist blocks adjacent to the light-transmitting portion is connected to the light-transmitting portion.

In the display panel provided by an embodiment of the present invention, the second segment of each of the scan lines is disposed in a same layer as the second segment of each of the data lines.

In the display panel provided by an embodiment of the present invention, the display panel further includes a first substrate and a second substrate, which are arranged oppositely. The liquid crystal layer is disposed between the first substrate and the second substrate.

The second segment of each of the scan lines is formed by overlapping a through hole of an interlayer dielectric layer of the first substrate and a gate of the first substrate.

In the display panel provided by an embodiment of the present invention, the second segment of each of the data lines is formed by overlapping a through hole of the interlayer dielectric layer of the first substrate and a source of the first substrate.

In the display panel provided by an embodiment of the present invention, a distribution density of pixel units of the first display region is greater than a distribution density of pixel units of the second display region.

In the display panel provided by an embodiment of the present invention, the transparent electrode group includes a first pixel electrode disposed in a portion corresponding to the light-transmitting portion.

The switch control unit includes a first switch control unit disposed in a portion corresponding to the light-transmitting portion.

The first switch control unit is electrically connected to the first pixel electrode. The first switch control unit is configured to independently control the light-transmitting portion to put the light-transmitting portion in the light-transmitting state or the opaque state.

An embodiment of the present invention further provides an electronic terminal including a display panel and a camera component. The display panel includes a first display region and a second display region. The first display region surrounds at least a portion of the second display region. The second display region includes a plurality of display subregions. Each of the plurality of display subregions includes a display portion and a light-transmitting portion. The camera component is disposed in the second display region and is configured to obtain an external light signal. Each of the plurality of display subregions includes:

a switch control unit;

a liquid crystal layer disposed in the display portion and the light-transmitting portion;

a transparent electrode group electrically connected to the switch control unit and corresponding to the display portion and the light-transmitting portion, wherein the transparent electrode group is configured to control a deflection direction of liquid crystal molecules in the liquid crystal layer, which puts the light-transmitting portion in a light-transmitting state or an opaque state; and a color filter layer disposed in the display portion.

In the electronic terminal provided by an embodiment of the present invention, each of the plurality of display subregions further includes scan lines and data lines.

The scan lines extend along a first direction. Each of the scan lines includes a first segment and a second segment, which are connected to each other. The first segment of each of the scan lines is disposed in the display portion. The second segment of each of the scan lines is disposed in the light-transmitting portion and is a transparent scan line.

The data lines extend along a second direction. Each of the data lines includes a first segment and a second segment. The first segment of each of the data lines is disposed in the display portion. The second segment of each of the data lines is disposed in the light-transmitting portion and is a transparent data line.

An intersection of the first segment of each of the scan lines and the first segment of each of the data lines, which are adjacent to each other, is defined as a pixel unit.

In the electronic terminal provided by an embodiment of the present invention, the data lines include first type data lines and second type data lines. The first type data lines and the second type data lines are arranged along the first direction. A first segment of each of the second type data lines includes a transparent data line.

In the electronic terminal provided by an embodiment of the present invention, the second type data lines are disposed on a side of the display portion adjacent to the light-transmitting portion.

In the electronic terminal provided by an embodiment of the present invention, the color filter layer includes light-shielding strips and color resist blocks. Each of the light-shielding strips corresponds to a first segment of each of the first type data lines. One of the color resist blocks adjacent to the light-transmitting portion is connected to the light-transmitting portion.

In the electronic terminal provided by an embodiment of the present invention, the second segment of each of the scan lines is disposed in a same layer as the second segment of each of the data lines.

In the electronic terminal provided by an embodiment of the present invention, the display panel further includes a first substrate and a second substrate, which are arranged oppositely. The liquid crystal layer is disposed between the first substrate and the second substrate.

The second segment of each of the scan lines is formed by overlapping a through hole of an interlayer dielectric layer of the first substrate and a gate of the first substrate.

In the electronic terminal provided by an embodiment of the present invention, the second segment of each of the data lines is formed by overlapping a through hole of the interlayer dielectric layer of the first substrate and a source of the first substrate.

In the electronic terminal provided by an embodiment of the present invention, a distribution density of pixel units of the first display region is greater than a distribution density of pixel units of the second display region.

In the electronic terminal provided by an embodiment of the present invention, the transparent electrode group includes a first pixel electrode disposed in a portion corresponding to the light-transmitting portion.

The switch control unit includes a first switch control unit disposed in a portion corresponding to the light-transmitting portion.

The first switch control unit is electrically connected to the first pixel electrode. The first switch control unit is configured to independently control the light-transmitting portion to put the light-transmitting portion in the light-transmitting state or the opaque state.

The present invention provides the display panel and the electronic terminal. The display panel provided by an embodiment of the present invention includes the first display region and the second display region. The display panel of an embodiment of the present invention is provided with the display portion and the light-transmitting portion in the second display region. The display portion has a display function. The light-transmitting portion has the independently controlled switch control unit, which can independently control the deflection of the liquid crystal molecules in the liquid crystal layer corresponding to the light-transmitting portion to realize a light transmission function. Accordingly, the second display region can have the display function and light transmission function at the same time, so a screen-to-body ratio of the display panel is increased, and a true full-screen display is realized.

DETAILED DESCRIPTION OF PREFERRED EMBODIMENTS

Figure 1:
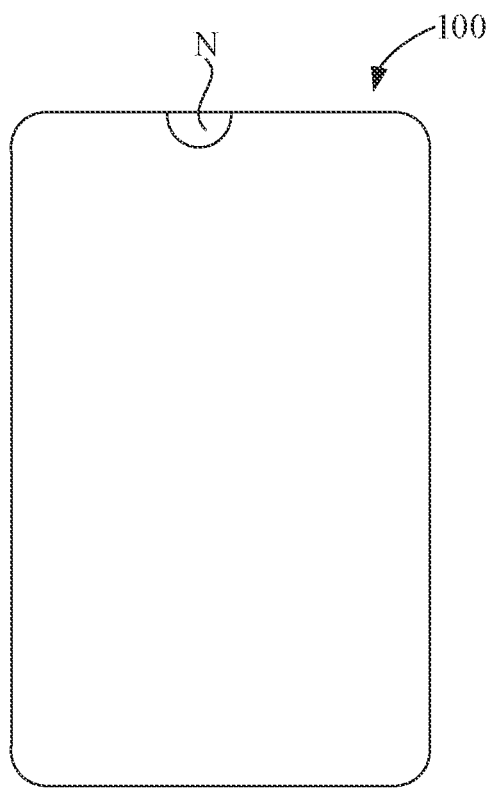
FIG. 1 is a top view of a display panel in the prior art.

In order to make purposes, technical solutions, and advantages of the present invention clearer, the following describes specific embodiments of the present invention in detail with reference to the accompanying drawings. Please refer to the drawings, structurally identical components are designated by the same reference numerals. The following description is based on the specific embodiments of the present invention, which should not be regarded as limiting other specific embodiments of the present invention that are not described in detail herein. The term "embodiment" used in this specification means an example, a demonstration, or an illustration.

In the description of the present invention, it should be explained that the terms "center", "portrait", "transverse", "length", "width", "thickness", "upper", "lower", "front", the directions or positional relationships indicated by "back", "left", "right", "vertical", "horizontal", "top", "bottom", "inside", "outside", etc. are based on the drawings. The orientation or positional relationship is only for the convenience of describing the present invention and simplifying the description, and does not indicate or imply that the device or element referred to must have a specific orientation, structure and operation in a specific orientation, and should not be viewed as limitations of the present invention. In addition, terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present invention, the meaning of "multiple" is two or more, unless specifically defined otherwise.

In the description of the present invention, it should be explained that terms "installation", "link", and "connection" should be understood broadly, unless explicitly stated and limited otherwise. For example, connection can be fixed connection or removable or integral connection, can be mechanical connection, electrical connection or mutual communication, can be direct connection or indirect connection through an intermedium, or can be the internal communication between two components or the mutual reaction between two components. For a skilled person in the art, the specific meanings of the above terms of the present invention can be understood according to practical situations.

An embodiment of the present invention provides an electronic terminal. The electronic terminal can be mobile terminal equipment such as a mobile phone and a tablet computer, and can be equipment having a display device such as gaming equipment, augmented reality (AR) equipment, virtual reality (VR) equipment, a vehicle-mounted computer, a laptop computer, a data storage device, an audio playback device, a video playback device, and a wearable device. The wearable device can be a smart bracelet, smart glasses, etc.

Figure 2:
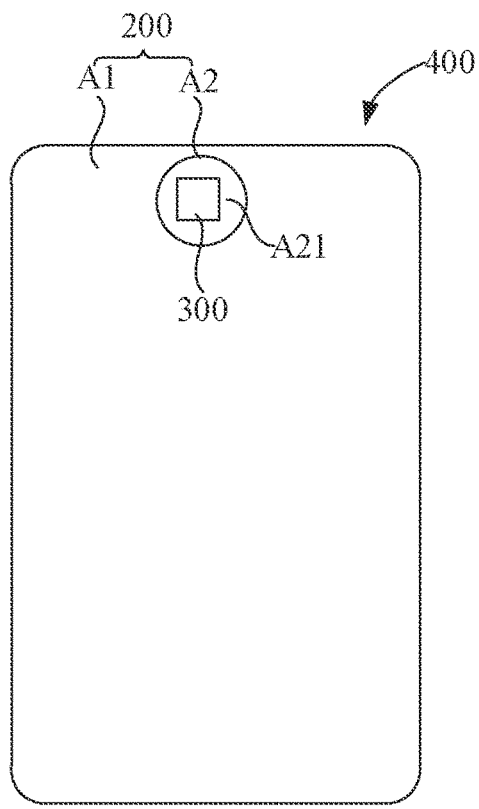
FIG. 2 is a top view of an electronic terminal provided by an embodiment of the present invention.

Please refer to FIG. 2. FIG. 2 is a top view of an electronic terminal provided by an embodiment of the present invention. FIG. 2 shows an example that the electronic terminal is a mobile phone. The electronic terminal 400 includes a display panel 200 and a camera component 300. The camera component 300 is disposed in a second display region A2. The second display region A2 includes a plurality of display subregions A21. The display subregions A21 surrounds at least a portion of the camera component 300. The camera component 300 is configured to obtain an external light signal passing through the second display region A2. It can be understood that the camera component 300 is disposed under second display region A2 of the display panel 200, and the camera component 300 is configured to obtain the external light signal passing through the second display region A2 of the display panel 200 and images according to the obtained external light signal. A display region of the display panel 200 of the electronic terminal 400 provided by an embodiment of the present invention is complete, which increases a screen-to-body ratio of the electronic terminal. The camera component 300 can be configured as a front camera component of the electronic terminal. The camera component 300 can be configured to obtained images such as users' selfies through the second display region A2 of the display panel 200.

When the camera component 300 is turned on, light-transmitting portions corresponding to the second display region A2 are in a completely transparent state, and the camera component 300 obtains the external light signal passing through the light-transmitting portions for imaging. When the display panel 200 displays, display portions corresponding to a first display region A1 and the second display region A2 display images, and the light-transmitting portions corresponding to the second display region A2 is in an opaque state, which shows a grayscale or is in a black state. In this way the screen-to-body ratio of the electronic terminal is increased, and a full-screen display effect is realized.

Figure 3:
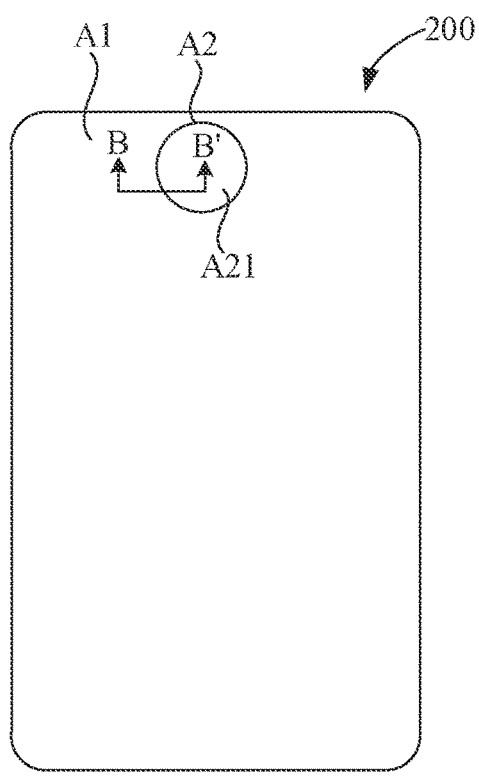
FIG. 3 is a top view of a display panel provided by an embodiment of the present invention.
Figure 4:
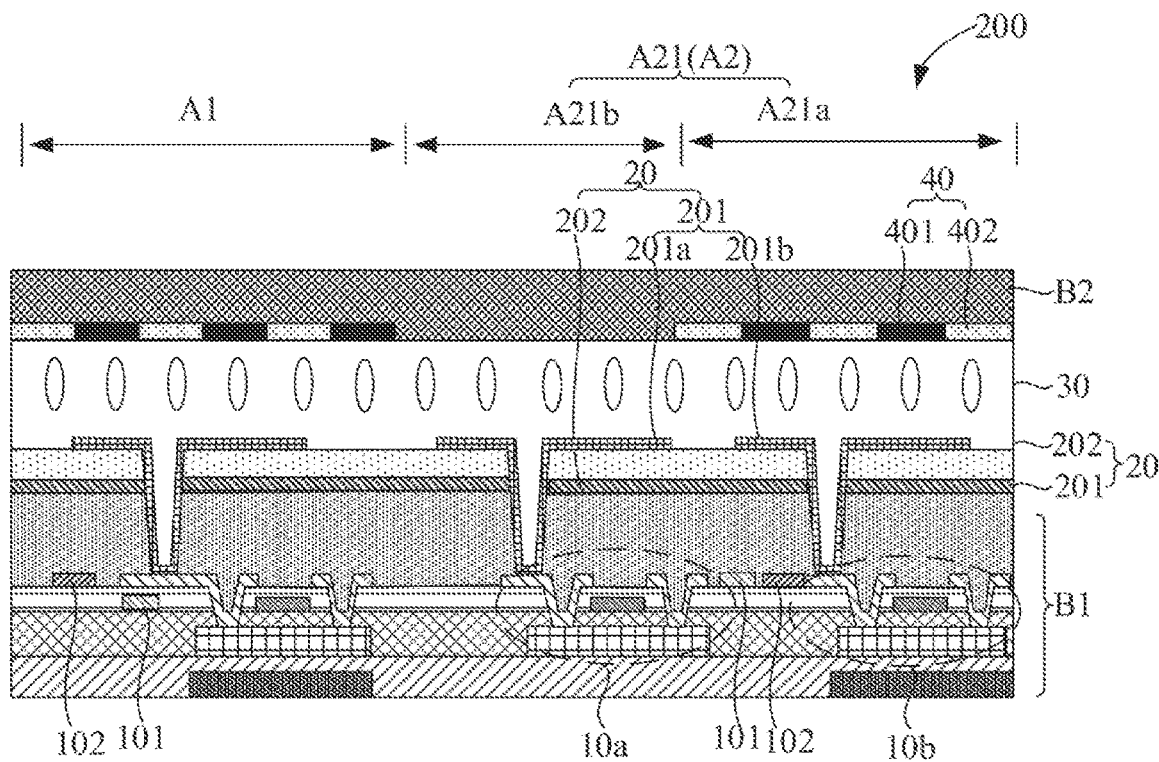
FIG. 4 is a cross-sectional view of FIG. 3 taken along line B-B'.

The present invention further provides the display panel. With reference to FIGS. 3 and 4, FIG. 3 is a top view of the display panel provided by an embodiment of the present invention, and FIG. 4 is a cross-sectional view of FIG. 3 taken along line B-B'. The display panel 200 includes the first display region A1 and the second display region A2. The first display region A1 surrounds at least a portion of the second display region A2. The second display region A2 includes a plurality of display subregions A21. Each of the plurality of display subregions A21 includes a display portion A21a and a light-transmitting portion A21b.

Specifically, a display subregion A21 includes a switch control unit, a transparent electrode group 20, a liquid crystal layer 30, and a color filter layer 40. The transparent electrode group 20 is electrically connected to the switch control unit. The switch control unit includes a first switch control unit 10a and a second switch control unit 10b. The transparent electrode group 20 corresponds to the display portion A21a and the light-transmitting portion A21b. The transparent electrode group 20 is configured to control a deflection direction of liquid crystal molecules in the liquid crystal layer, which puts the light-transmitting portion A21b in a light-transmitting state or an opaque state. The liquid crystal layer 30 is disposed in the display portion A21a and the light-transmitting portion A21b. The color filter layer 40 is disposed in the display portion A21a.

The first switch control unit 10a is configured to independently control a voltage of the transparent electrode group 20 in the light-transmitting portion A21b, so the light-transmitting portion A21b independently performs a grayscale display. Compared with a configuration in the prior art that the light-transmitting portion only displays in a black state, the present invention increases a screen-to-body ratio of the display panel. In an embodiment, the first switch control unit 10a is only a thin-film transistor for individually controlling the light-transmitting portion A21b to be in the light-transmitting state or the opaque state.

The transparent electrode group 20 includes a first pixel electrode 201a, a second pixel electrode 201b, and a common electrode 202. The first pixel electrode 201a, the second pixel electrode 201b, and the common electrode 202 are disposed on one side of the liquid crystal layer 30. Alternatively, the first pixel electrode 201a, the second pixel electrode 201b, and the common electrode 202 are separately disposed on two opposite sides of the liquid crystal layer 30. It should be explained that this embodiment takes the first pixel electrode 201a, the second pixel electrode 201b, and the common electrode 202 being disposed on one side of the liquid crystal layer 30 as an example, that is, the display panel 200 is an in-plane switching (IPS) type display panel. Understandably, embodiments of the present invention also include other types of display panels such as twisted nematic (TN) type, vertical alignment (VA) type, and fringe field switching (FFS) type. The pixel electrode 201 and the common electrode 202 include transparent indium-tin-oxide (ITO) electrodes.

Figure 5:
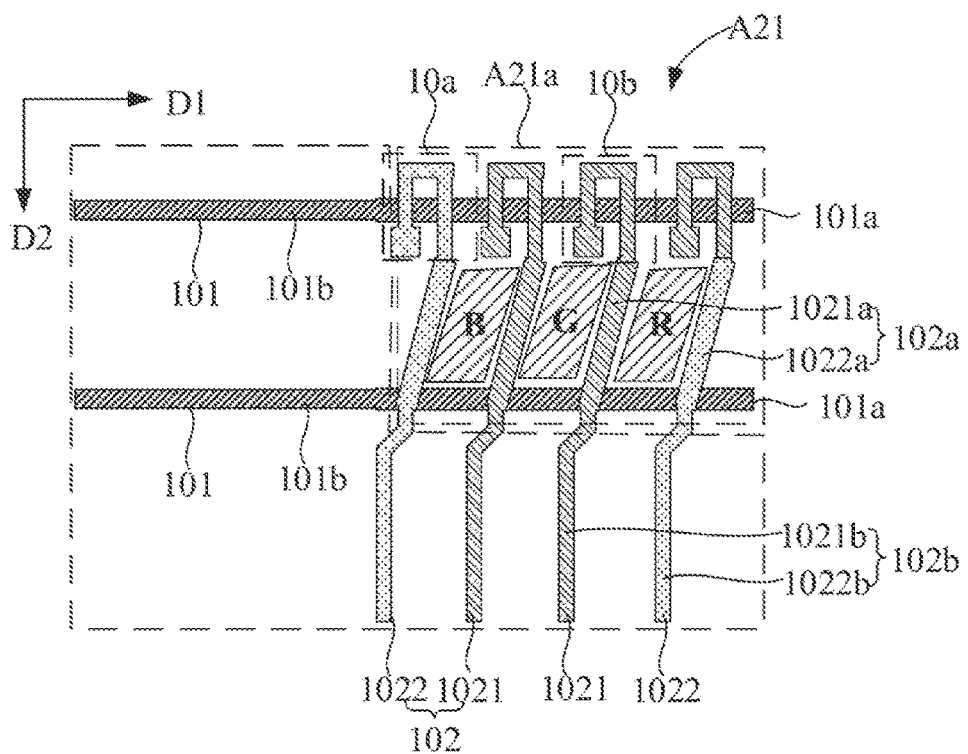
FIGS. 5-7 are top views of a display subregion in the display panel provided by an embodiment of the present invention.

Please further refer to FIG. 5, FIG. 5 is a top view of the display subregion A21 in the display panel 200. The display subregion A21 further includes scan lines 101 and data lines 102. The scan lines 101 extend along a first direction D1. A scan line 101 includes a first segment 101a and a second segment 101b, which are connected to each other. The first segment 101a of the scan line 101 is disposed in the display portion A21a. The second segment 101b of the scan line 101 is disposed in the light-transmitting portion A21b. The second segment 101b of the scan line 101 is a transparent scan line. The data lines 102 extend along a second direction D2. A data line 102 includes a first segment 102a and a second segment 102b. The first segment 102a of the data line 102 is disposed in the display portion A21a. The second segment 102b of the data line 102 is disposed in the light-transmitting portion A21b. The second segment 102b of the data line 102 is a transparent data line. An intersection of the first segment 101a of the scan line 101 and the first segment 102a of the data line 102, which are adjacent to each other, is defined as a pixel unit. The pixel unit is configured to display color. The pixel unit includes a red subpixel unit R, a green subpixel unit G, and a blue subpixel unit B.

Furthermore, please continue to refer to FIG. 5. The data lines 102 include first type data lines 1021 and second type data lines 1022. The first type data lines 1021 and the second type data lines 1022 are arranged along the first direction D1. A first segment 1022a of a second type data line 1022 includes a transparent data line. A second segment 1021b of a first type data line 1021 is a transparent data line. The second type data lines 1022 are disposed on a side of the display portion A21a adjacent to the light-transmitting portion A21b. The first segment 1022a of the second type data line 1022 adjacent to the light-transmitting portion A21b is electrically connected to the first switch control unit 10a.

Figure 6:
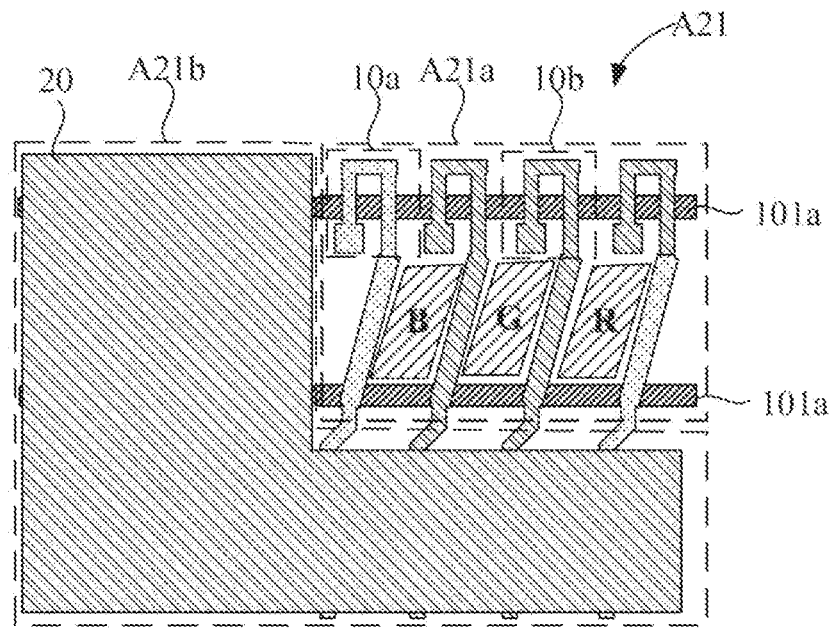

With reference to FIGS. 4 and 6, the transparent electrode group 20 includes the first pixel electrode 201a and the second pixel electrode 201b. The first pixel electrode 201a is disposed in a portion corresponding to the light-transmitting portion. The switch control unit includes the first switch control unit 10a and the second switch control unit 10b. The first switch control unit 10a is disposed in a portion corresponding to the light-transmitting portion A21b. The second switch control unit 10b is disposed in a portion corresponding to the display portion A21a. The first switch control unit 10a is electrically connected to the first pixel electrode 201a. The first switch control unit 10a is electrically connected to the second type data line 1022. The first switch control unit 10a is configured to control an applied voltage of the first pixel electrode 201a, so as to independently control the light-transmitting portion A21b to put the light-transmitting portion A21b in the light-transmitting state or the opaque state.

The second switch control unit 10b is electrically connected to the second pixel electrode 201a. The second switch control unit 10b is electrically connected to the first type data line 1021. The second control unit 10b is configured to control an applied voltage of the second pixel electrode 201b to put the light-transmitting portion A21b in the light-transmitting state or the opaque state.

When the light-transmitting portion A21b is in the light-transmitting state, the display portion A21a is in a non-display state. When the light-transmitting portion A21b is in a non-light transmitting state, the display portion A21a is in a display state or the non-display state.

Figure 7:
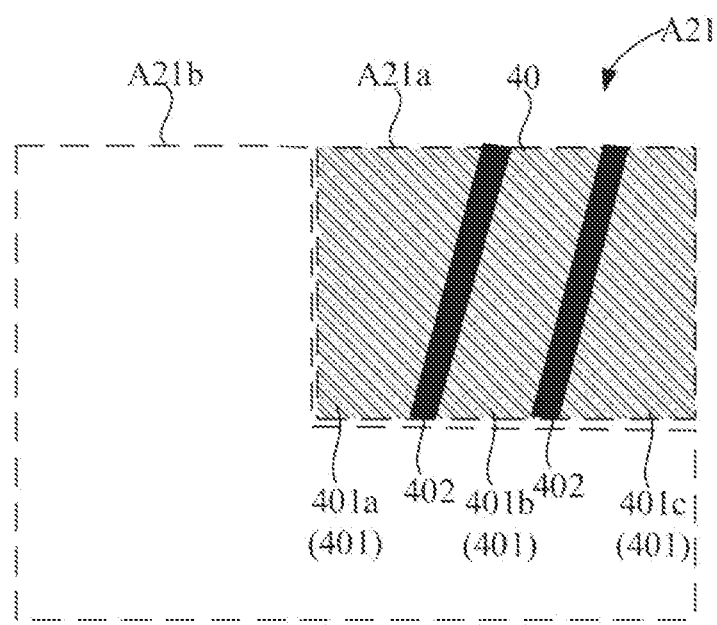

It should be explained that the light-transmitting portion A21b is provided with the first pixel electrode 201a and the common electrode 202. The first pixel electrode 201a and the common electrode 202 are disposed on one side of the liquid crystal layer 30. Alternatively, the first pixel electrode 201a and the common electrode 202 are separately disposed on two opposite sides of the liquid crystal layer 30. When a high voltage is applied to the first pixel electrode 201a, the first pixel electrode 201a and the common electrode 202 have a high voltage difference, the deflection direction of the liquid crystal molecules in the liquid crystal layer 30 in the light-transmitting portion A21b is controlled, and the liquid crystal layer 30 is in the transparent state at this time. When a low voltage is applied to the first pixel electrode 201a, the first pixel electrode 201a and the common electrode 202 have a low voltage difference, the deflection direction of the liquid crystal molecules in the liquid crystal layer 30 in the light-transmitting portion A21b is controlled, and the liquid crystal layer 30 is in the opaque state, which shows a grayscale or is in a black state at this time. In an embodiment of the present invention, the display portion A21a corresponding to the second display region A2 has a display function, and the light-transmitting portion A21b has a light-transmitting function, which can supplement light to the second display region A2, reducing dependence on light of a backlight module With reference to FIGS. 5 and 7, FIG. 7 is a top view of the display subregion A21 provided with the color filter layer 40. The color filter layer 40 includes light-shielding strips 402 and color resist blocks 401. A light-shielding strip 402 corresponds to a first segment 1021a of the first type data line 1021. A color resist block 401 adjacent to the light-transmitting portion A21b is connected to the light-transmitting portion A21b. The color resist block 401 includes a first color resist block 401a, a second color resist block 401b, and a third color resist block 401c.

Figure 8:
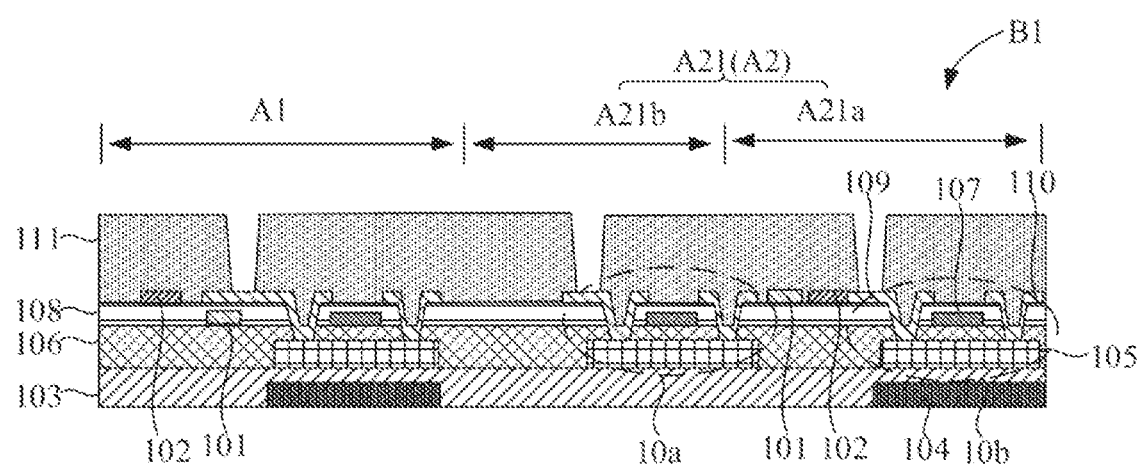
FIG. 8 is a structural schematic diagram of a first substrate of the display panel provided by an embodiment of the present invention.

With reference to FIGS. 4, 5, and 8, FIG. 8 is a structural schematic diagram of a first substrate of the display panel provided by an embodiment of the present invention. The second segment 101b of the scan line 101 is disposed in a same layer as the second segment 102b of the data line 102. Specifically, the display panel 200 further includes the first substrate B1 and a second substrate B2, which are arranged opposite to each other. The liquid crystal layer 30 is disposed between the first substrate B1 and the second substrate B2. Specifically, the first substrate B1 includes a substrate 103, a light-shielding layer 104, an active layer 105, a gate insulating layer 106, a gate 107, an interlayer dielectric layer 108, a source 109, a drain 110, and a planarization layer 111. The light-shielding layer 104 is disposed on the substrate 103. The substrate 103 includes structures such as a glass substrate, a buffer layer, and a blocking layer. The active layer 105 is disposed on the substrate 103, and the active layer 105 corresponds to the light-shielding layer 104. An orthographic projection of the light-shielding layer 104 on the substrate 103 completely covers an orthographic projection of the active layer 105 on the substrate 103. The gate insulating layer 106 covers the active layer 105 and the substrate 103. The gate 107 is disposed on the gate insulating layer 106. The orthographic projection of the active layer 105 on the substrate 103 completely covers an orthographic projection of the gate 107 on the substrate 103. The interlayer dielectric layer 108 covers the gate 107 and the gate insulating layer 106. The source electrode 109 and the drain electrode 110 are electrically connected to the active layer 105. The planarization layer 111 covers the interlayer insulating layer 106. The second segment 101b of the scan line 101 is formed by overlapping a through hole of the interlayer dielectric layer 108 of the first substrate B1 and a gate 107 of the first substrate B1. The second segment 102b of the data line 102 is formed by overlapping a through hole of the interlayer dielectric layer 108 of the first substrate B1 and the source 109 of the first substrate B1.

Material of the first segment 101a of the scan line 101 is same as material of the gate, including one of metals of copper, aluminum, nickel, or molybdenum, or an alloy material formed by a combination thereof. Material of the second segment 101b of the scan line 101 includes transparent ITO material.

Material of the first segment 1021a of the first type data line 1021 is same as material of the source 109 and the drain 110, including one of metals such as copper, aluminum, nickel, or molybdenum, or an alloy material formed by a combination thereof. Material of the second segment 1021b of the first type data line 1021 and the second type data line 1022 includes the transparent ITO material.

An embodiment of the present invention configures the second segment 101b of the scan line 101, the second segment 1021b of the first type data line 1021, and the second type data line 1022 as transparent materials. By arranging the second segment 101b of the scan line 101 and the second type data line in the same layer through the through hole, the second segment 102b of the data line 102 and the second segment 101b of the scan line 101 positioned in the light-transmitting portion A21b are both transparent, which increases an light transmittance of the light-transmitting portion A21b.

The second substrate B2 includes a glass substrate. It should be explained that the color filter layer 40 of the present invention can be disposed on the second substrate B2, which means that the display panel is a non-color-filter-on-array (non-COA) structure display panel. Alternatively, the color filter layer 40 can be disposed on the first substrate B1, which means that the display panel is a COA structure display panel.

With reference to FIGS. 4 and 8, the data line 102 and the scan line 101 corresponding to the first display region A1 are respectively disposed in same layers as the source 109 and the gate 107. Material of the data line 102 and the scan line 101 corresponding to the first display region A1 includes one of metal materials such as aluminum, copper, nickel, or molybdenum, or an alloy material formed by a combination thereof. In other words, the data line 102 and the scan line 101 corresponding to the first display region A1 are not disposed in a same layer, but the second segment 101b of the scan line 101 and the second segment 102b of the data line corresponding to the second display region A2 are disposed in a same layer. Materials of the second segment 101b of the scan line 101 and the second segment 102b of the data line 102 are both transparent materials, which increase the light transmittance of the light-transmitting portion A21b. Furthermore, as shown in FIG. 4, the first pixel electrode 201a of the light-transmitting portion A21b corresponding to the second display region A2 is electrically connected to the first switch control unit 10a. The first switch control unit 10a can independently control the deflection direction of the liquid crystal molecules in the liquid crystal layer 30 of the light-transmitting portion A21b to allow it to have a grayscale display function. The light-transmitting portion A21b is not provided with the color film layer 40, so that it has a light-transmitting function. The display portion A21a corresponding to the second display region A2 is provided with the color filter layer 40, and the color filter layer 40 and the pixel unit provided on the display portion A21a are configured to display images together. The display portion A21a corresponding to the second display region A2 is able to display images. Compared with the second display region in the prior art that can only display in the black state, the screen-to-body ratio of the display panel of the present invention is increased. Moreover, the color resist block 401 adjacent to the light-transmitting portion A21b is connected to the light-transmitting portion A21b, which reduces an influence of the light-shielding strip 402 on a light-transmitting effect of the light-transmitting portion A21b.

Furthermore, a distribution density of pixel units of the first display region A1 is greater than a distribution density of pixel units of the second display region A2. Optionally, the distribution density of pixel units in the first display region A1 is four times the distribution density of pixel units in the second display region A2.

As shown in FIG. 2, an embodiment of the present invention designs a pixel structure for the second display region A2, so that the second display region A2 can not only display, but also satisfy imaging requirements of the camera component 300.

As shown in FIG. 1, in the prior art, an opening region N is configured to place the camera component, and this region can only be configured for taking pictures and not for display. That is, when the display region displays, the opening region N is a black circle, which gives human eyes a relatively abrupt feeling. As shown in FIG. 2, when the camera component 300 provided by an embodiment of the present invention is turned on, light-transmitting portions corresponding to the second display region A2 are in the completely transparent state, and the camera component 300 obtains the external light signal passing through the light-transmitting portions for imaging. When the display panel 200 displays, the display portions corresponding to the first display region A1 and the second display region A2 display images, and the light-transmitting portions corresponding to the second display region A2 is in the opaque state, which shows the grayscale or is in the black state. In this way the screen-to-body ratio of the electronic terminal is increased, and the full-screen display effect is realized. The electronic terminal provided by an embodiment of the present invention increases the light transmittance of the light-transmitting portion corresponding to the second display region while the display effect is ensured, so that the two can be balanced to satisfy customer requirements.

As shown in FIG. 8, in an embodiment of the present invention, a yellow-light process is followed by a process of forming the active layer 105 on the first substrate B1, so as to form ITO electrically connected to the source 109. The ITO can be disposed above or below the source and the drain. A main function of ITO is to connect with the source, the drain, or the gate, and change metals of the source, the drain, or the gate to transparent ITO in regions where light-transmission is needed.

The pixels in the second display region A2 of an embodiment of the present invention are designed to reduce a pixel density of pixels displayed in this region. For example, the pixel density of the first display region A1 is 395 pixels per inch (PPI), and the pixel density of the second display region A2 is reduced by three times to 131 PPI or two times to 197 PPI.

Specifically, please refer to FIG. 5. FIG. 5 shows the display subregion A21 in the second display region, an upper right corner is the display region A21a, and a rest of the display subregion A21 is the light-transmitting portion A21b. In order to make the light-transmitting portion A21b completely transparent, a specific implementation is to disposed a metal of the light-transmitting portion on a different layer. A horizontal gate display portion is the gate, a layer of the interlayer dielectric layer in the light-transmitting portion is replaced by a layer of the source/drain, and the source/drain is replaced by the second segment of the scan line, so the transparent ITO replacing the gate in the light-transmitting portion is realized. A vertical data line is directly replaced by the transparent ITO.

With reference to FIGS. 5 and 7, there is still shielded by a light-shielding strip 402 between the second color resist block 401b and the first color resist block 401a, or the second color resist block 401b and the third color resist block 401c to prevent a color cast in a large viewing angle. There is not disposed the light-shielding strip between the first color resist block 401a or the third color resist block 401c and the light-transmitting portion A21b.

Specifically, the second type data line 1022 is configured as a transparent ITO layer, and the light-shielding strip corresponding to the second type data line 1022 is cancelled. The data lines on left and right sides of the green subpixel unit still remain a configuration of source/drain metals, and the color film layers corresponding to the data lines on the left and right sides of the green subpixel unit are still shielded by the light-shielding strips. The data line on a left side of the blue subpixel unit for controlling the light-transmitting portion A21b is configured as a transparent ITO layer.

Please continue to refer to FIG. 5, one transparent data line is configured in each display subregion A21. The switch control unit controlling the transparent electrode group of the light-transmitting portion is added, so that the light-transmitting portion of each display subregion can independently display the grayscale. This arrangement eliminates opaque metals in the light-transmitting portion, so that a light-transmitting portion with 131 PPI accounts for 86.5%, and a light-transmitting portion with 197 PPI accounts for 70%. It should be explained that this embodiment of the present invention only exemplifies two examples that the pixel densities of the second display regions are 131 PPI and 197 PPI, and other embodiments are also within the protection scope of the present invention.

Please refer to FIGS. 2 and 6, in an embodiment of the present invention, when the camera component 300 is in operation, the light-transmitting portion A21b needs to be completely transparent to allow the camera component 300 to capture external images. When the camera component 300 is not in operation, the display portion corresponding to the second display subregion A21 requires display, so the light-transmitting portion A21b must be in the grayscale or the black state at this time, which cannot affect a normal display.

Please refer to FIG. 4, the light-transmitting portion A21b is provided with the pixel electrode 201 and the common electrode 202. When a high voltage is applied to the pixel electrode 201, the pixel electrode 201 and the common electrode 202 have a high voltage difference, the deflection direction of the liquid crystal molecules is controlled, and the liquid crystal layer s in the transparent state. When a low voltage is applied to the pixel electrode 201, the pixel electrode 201 and the common electrode 202 have a low voltage difference, the deflection direction of the liquid crystal molecules is controlled, and the liquid crystal layer is in the opaque state, which shows the grayscale or is in the black state.

An embodiment of the present invention adds the independent switch control unit to the display subregion A21 of the second display region A2, which is equivalent to an independent control of the light-transmitting portion in each display subregion and an independent grayscale display, instead of only displaying the black state. A main purpose is that compared with a normal region, taking the pixel density of the second display region being 200 PPI as an example, the pixel density of the second display region is only ¼. A brightness of the second display region needs to be increased several times to keep human eyes from observing an obvious abrupt display effect. Therefore, a brightness of a backlight module needs to be independently and specially designed. During display periods, an embodiment of the present invention adjusts the independent light-transmitting portion from a standard black state to a grayscale display, performs light supplement, and reduces dependence on the backlight module.

In addition, because the pixel density of the pixel units in the second display region A2 is low, and color point drifts are severe, the grayscale display of the independent light-transmitting portion of an embodiment of the present invention greatly helps to alleviate the color point drifts.

The present invention provides the display panel and the electronic terminal. The display panel provided by an embodiment of the present invention includes the first display region and the second display region. The display panel of an embodiment of the present invention is provided with the display portion and the light-transmitting portion in the second display region. The display portion has the display function. The light-transmitting portion has the independently controlled switch control unit, which can independently control the deflection of the liquid crystal molecules in the liquid crystal layer corresponding to the light-transmitting portion to realize the light transmission function. Accordingly, the second display region can have the display function and light transmission function at the same time, so the screen-to-body ratio of the display panel is increased, and a true full-screen display is realized.

Although the present invention has been disclosed above with the preferred embodiments, it is not intended to limit the present invention. Persons having ordinary skill in this technical field can still make various alterations and modifications without departing from the scope and spirit of this invention. Therefore, the scope of the present invention should be defined and protected by the following claims and their equivalents.

What is claimed is:

1. A display panel, comprising
a first display region and a second display region;
wherein the first display region surrounds at least a portion of the second display region, the second display region comprises a plurality of display subregions, and each of the plurality of display subregions comprises a display portion and a light-transmitting portion; and
wherein each of the plurality of display subregions comprises:
a switch control unit;
a liquid crystal layer disposed in the display portion and the light-transmitting portion;
a transparent electrode group electrically connected to the switch control unit and corresponding to the display portion and the light-transmitting portion, wherein the transparent electrode group is configured to control a deflection direction of liquid crystal molecules in the liquid crystal layer, which puts the light-transmitting portion in a light-transmitting state or an opaque state; and
a color filter layer disposed in the display portion;
wherein each of the plurality of display subregions further comprises data lines, each of the data lines comprises a first segment and a second segment, the first segment of each of the data lines is disposed in the display portion, and the second segment of each of the data lines is disposed in the light-transmitting portion; and the data lines comprise first type data lines and second type data lines, the first type data lines and the second type data lines are arranged along a first direction, and a first segment of each of the second type data lines comprises a transparent data line.

2. The display panel according to claim 1, wherein each of the plurality of display subregions further comprises
scan lines;
the scan lines extend along the first direction, each of the scan lines comprises a first segment and a second segment, which are connected to each other, the first segment of each of the scan lines is disposed in the display portion, and the second segment of each of the scan lines is disposed in the light-transmitting portion and is a transparent scan line;
the data lines extend along a second direction, and the second segment of each of the data lines is a transparent data line; and
an intersection of the first segment of each of the scan lines and the first segment of each of the data lines, which are adjacent to each other, is defined as a pixel unit.

3. The display panel according to claim 2, wherein the second type data lines are disposed on a side of the display portion adjacent to the light-transmitting portion.

4. The display panel according to claim 2, wherein the color filter layer comprises light-shielding strips and color resist blocks, each of the light-shielding strips corresponds to a first segment of each of the first type data lines, and one of the color resist blocks adjacent to the light-transmitting portion is connected to the light-transmitting portion.

5. The display panel according to claim 2, wherein the second segment of each of the scan lines is disposed in a same layer as the second segment of each of the data lines.

6. The display panel according to claim 5, wherein the display panel further comprises a first substrate and a second substrate, which are arranged opposite to each other, and the liquid crystal layer is disposed between the first substrate and the second substrate; and
the second segment of each of the scan lines is formed by overlapping a through hole of an interlayer dielectric layer of the first substrate and a gate of the first substrate.

7. The display panel according to claim 6, wherein the second segment of each of the data lines is formed by overlapping a through hole of the interlayer dielectric layer of the first substrate and a source of the first substrate.

8. The display panel according to claim 1, wherein a distribution density of pixel units of the first display region is greater than a distribution density of pixel units of the second display region.

9. The display panel according to claim 1, wherein the transparent electrode group comprises a first pixel electrode disposed in a portion corresponding to the light-transmitting portion;
the switch control unit comprises a first switch control unit disposed in a portion corresponding to the light-transmitting portion; and
the first switch control unit is electrically connected to the first pixel electrode, and the first switch control unit is configured to independently control the light-transmitting portion to put the light-transmitting portion in the light-transmitting state or the opaque state.

10. An electronic terminal, comprising
a display panel and a camera component;
wherein the display panel comprises a first display region and a second display region, the first display region surrounds at least a portion of the second display region, the second display region comprises a plurality of display subregions, each of the plurality of display subregions comprises a display portion and a light-transmitting portion, and the camera component is disposed in the second display region and is configured to obtain an external light signal;
wherein each of the plurality of display subregions comprises:
a switch control unit;
a liquid crystal layer disposed in the display portion and the light-transmitting portion;
a transparent electrode group electrically connected to the switch control unit and corresponding to the display portion and the light-transmitting portion, wherein the transparent electrode group is configured to control a deflection direction of liquid crystal molecules in the liquid crystal layer, which puts the light-transmitting portion in a light-transmitting state or an opaque state; and
a color filter layer disposed in the display portion;
wherein each of the plurality of display subregions further comprises data lines, each of the data lines comprises a first segment and a second segment, the first segment of each of the data lines is disposed in the display portion, and the second segment of each of the data lines is disposed in the light-transmitting portion; and
the data lines comprise first type data lines and second type data lines, the first type data lines and the second type data lines are arranged along a first direction, and a first segment of each of the second type data lines comprises a transparent data line.

11. The electronic terminal according to claim 10, wherein each of the plurality of display subregions further comprises scan lines;
the scan lines extend along the first direction, each of the scan lines comprises a first segment and a second segment, which are connected to each other, the first segment of each of the scan lines is disposed in the display portion, and the second segment of each of the scan lines is disposed in the light-transmitting portion and is a transparent scan line;
the data lines extend along a second direction, and the second segment of each of the data lines is a transparent data line; and
an intersection of the first segment of each of the scan lines and the first segment of each of the data lines, which are adjacent to each other, is defined as a pixel unit.

12. The electronic terminal according to claim 11, wherein the second type data lines are disposed on a side of the display portion adjacent to the light-transmitting portion.

13. The electronic terminal according to claim 11, wherein the color filter layer comprises light-shielding strips and color resist blocks, each of the light-shielding strips corresponds to a first segment of each of the first type data lines, and one of the color resist blocks adjacent to the light-transmitting portion is connected to the light-transmitting portion.

14. The electronic terminal according to claim 11, wherein the second segment of each of the scan lines is disposed in a same layer as the second segment of each of the data lines.

15. The electronic terminal according to claim 14, wherein the display panel further comprises a first substrate and a second substrate, which are arranged opposite to each other, and the liquid crystal layer is disposed between the first substrate and the second substrate; and the second segment of each of the scan lines is formed by overlapping a through hole of an interlayer dielectric layer of the first substrate and a gate of the first substrate.

16. The electronic terminal according to claim 15, wherein the second segment of each of the data lines is formed by overlapping a through hole of the interlayer dielectric layer of the first substrate and a source of the first substrate.

17. The electronic terminal according to claim 10, wherein a distribution density of pixel units of the first display region is greater than a distribution density of pixel units of the second display region.

18. The electronic terminal according to claim 10, wherein the transparent electrode group comprises a first pixel electrode disposed in a portion corresponding to the light-transmitting portion;

the switch control unit comprises a first switch control unit disposed in a portion corresponding to the light-transmitting portion; and the first switch control unit is electrically connected to the first pixel electrode, and the first switch control unit is configured to independently control the light-transmitting portion to put the light-transmitting portion in the light-transmitting state or the opaque state.

19. A display panel, comprising a first display region and a second display region;

wherein the first display region surrounds at least a portion of the second display region, the second display region comprises a plurality of display subregions, and each of the plurality of display subregions comprises a display portion and a light-transmitting portion; and wherein each of the plurality of display subregions comprises:

a switch control unit;

a liquid crystal layer disposed in the display portion and the light-transmitting portion;

a transparent electrode group electrically connected to the switch control unit and corresponding to the display portion and the light-transmitting portion, wherein the transparent electrode group is configured to control a deflection direction of liquid crystal molecules in the liquid crystal layer, which puts the light-transmitting portion in a light-transmitting state or an opaque state; and a color filter layer disposed in the display portion;

wherein each of the plurality of display subregions further comprises scan lines extending along a first direction and data lines extending along a second direction, the data lines comprise first type data lines and second type data lines, the first type data lines and the second type data lines are arranged along the first direction, and a first segment of each of the second type data lines comprises a transparent data line.

* * * * *